(12) United States Patent
Gomez et al.

(10) Patent No.: US 7,765,766 B2
(45) Date of Patent: Aug. 3, 2010

(54) ASSEMBLY STRUCTURE AND PROCEDURE FOR CONCRETE TOWERS USED IN WIND TURBINES

(75) Inventors: Miguel Angel Fernandez Gomez, Madrid (ES); Jose Emilio Jimeno Chueca, Madrid (ES)

(73) Assignee: INNEO21, S.L., Madrid (ES)

( * ) Notice: Subject to any disclaimer, the term of this patent is extended or adjusted under 35 U.S.C. 154(b) by 321 days.

(21) Appl. No.: 11/881,665

(22) Filed: Jul. 26, 2007

(65) Prior Publication Data

US 2008/0040983 A1 Feb. 21, 2008

(30) Foreign Application Priority Data

Aug. 16, 2006 (ES) ............................. 200602204

(51) Int. Cl.
*E04G 21/00* (2006.01)
(52) U.S. Cl. .............. 52/745.04; 52/742.16; 52/745.18; 52/745.19; 52/843; 52/848
(58) Field of Classification Search ............ 52/143, 52/296, 297, 169.9, 419, 583.1, 742.14, 742.16, 52/745.03, 745.04, 745.1, 745.18, 745.19, 52/745.2, 836, 843, 848
See application file for complete search history.

(56) References Cited

U.S. PATENT DOCUMENTS

| | | | |
|---|---|---|---|
| 2,958,983 A | 11/1960 | Hoover | |
| 5,038,540 A * | 8/1991 | Krautz | 52/245 |
| 6,282,863 B1 * | 9/2001 | Christian et al. | 52/747.1 |
| 6,367,214 B1 * | 4/2002 | Monachino | 52/247 |
| 6,443,655 B1 * | 9/2002 | Bennett | 405/114 |
| 7,162,844 B2 * | 1/2007 | Morrison et al. | 52/245 |
| 7,343,718 B2 * | 3/2008 | Foust et al. | 52/745.17 |
| 2005/0072067 A1 * | 4/2005 | Wobben | 52/155 |
| 2005/0129504 A1 * | 6/2005 | De Roest | 415/4.2 |
| 2005/0166521 A1 * | 8/2005 | Silber | 52/633 |
| 2006/0156681 A1 | 7/2006 | Fernandez Gomez et al. | |
| 2006/0213145 A1 * | 9/2006 | Haller | 52/651.01 |
| 2006/0272244 A1 * | 12/2006 | Jensen | 52/223.5 |
| 2007/0151089 A1 * | 7/2007 | Franco | 29/452 |
| 2008/0209842 A1 * | 9/2008 | Fraguet et al. | 52/651.07 |
| 2008/0302038 A1 * | 12/2008 | Wobben | 52/296 |
| 2009/0019816 A1 * | 1/2009 | Lockwood et al. | 52/848 |

FOREIGN PATENT DOCUMENTS

ES 1058539 12/2004

(Continued)

*Primary Examiner*—Brian E Glessner
(74) *Attorney, Agent, or Firm*—K&L Gates LLP

(57) ABSTRACT

Structure and procedure for erecting concrete towers used in wind turbines in which said towers consist of sections, which in turn may each comprise a different number of segments or longitudinal sections. The procedure includes two differentiated cycles, which may take place alongside each other: the pre-assembly of each section of tower and their assembly. The sections may be pre-mounted on bases placed on the ground, with the segment in turn fitted with the help of struts and mechanical clamps. This procedure is extremely versatile in that it makes the best logistic use of the material, resources and requisite assembly times since the assembly procedures for each section can be developed alongside each other in the different wind farm towers, and also greater heights can be achieved than is traditionally possible.

20 Claims, 7 Drawing Sheets

FOREIGN PATENT DOCUMENTS

| | | |
|---|---|---|
| ES | 2234392 | 6/2005 |
| FR | 2539792 | 7/1984 |
| FR | 2652115 | 3/1991 |
| GB | 2183269 | 6/1987 |
| JP | 7090928 | 4/1995 |
| JP | 2000283019 A2 * | 10/2000 |

* cited by examiner

ASSEMBLY STRUCTURE AND PROCEDURE FOR CONCRETE TOWERS USED IN WIND TURBINES

RELATED APPLICATIONS

This application claims the foreign priority benefit, under 35 U.S.C. 119, of Spanish Application No. 200602204 filed on Aug. 16, 2006, the entire contents of which are incorporated by reference herein.

BACKGROUND OF THE INVENTION

The present invention, structure and procedure for assembling concrete used in wind turbines refers to an original and innovative structure and its associated assembly procedure, for the construction of wind turbine generators in wind farms.

Therefore, the present invention will be of particular interest for the industry supplying wind turbines for making use of wind energy and for the construction industry in respect of civil work for this type of installation.

The structure and procedure which is the object of this invention presupposes an advance in respect of the present State of the Art, although it is based on specific inventions developed by the same holder in a continuously innovative process in this section to which the object of the present invention refers.

In addition, this permits the financially and technically viable development of large concrete towers, which exceed the height of the steel towers traditionally used, and which overcome specific structural problems, in particular vibrations and fatigue which are the chief obstacle to developing height in wind turbines currently installed in commercial wind farms.

It is a well known fact that wind power is currently being developed worldwide and especially in European countries such as Germany, Spain and Denmark.

Following more than a decade of considerable technological advances progressing from dozens of kW to today's MW, it became increasingly clear that there was a need to move towards machines with larger diameter blades (from 90 metres at present) and to a greater hub height reaching over one hundred metres. This development requires new technologies, which will enable the viable construction in terms of costs and time of progressively higher towers.

In this process of advancing the State of the Art, the following three inventions by the same holder of the present invention may be cited as reference since they belong to the same scope of the art.

Thus, utility model U200502266 "Mould perfected for the execution of prefabricated concrete elements for the construction of modular towers for wind turbines", is an invention consisting of formwork made from metal, PVC, fibre-glass or any other material, required to manufacture elements with complicated geometry and strict tolerances, required in the manufacture of towers within the same scope of application as the present invention. This invention satisfactorily resolves specific problems associated with manufacture, using precast concrete, of elements for the construction of modular towers for wind turbines.

In addition, Utility model U200501400 "Perfected structure of joints between plates of modular towers for wind turbines and other applications" consists of an innovative and original structure for joining the plates which make up the aforementioned towers, supporting the wind turbine electricity generators.

Finally, another Spanish invention pertinent to this same state of the art, describes in Utility model U200402304 "Perfected structure of a modular tower for wind turbines and other applications" which consists of another invention by the same inventor which claims the division of the tower into sections limited by horizontal joints and the division of each section of tower into different prefabricated elements, known as segments, in portions, so that they have dimensions and weights which facilitate their transportation from the factory to the wind farm. In this technique the union of the various structural elements is achieved by means of reinforced or pre-stressed connections. All of which implies the need to resolve the union of these elements so that problems of resistance and deformation associated with such unions using different materials in a situation where they require the special characteristics of water tightness and mechanical resistance.

Nevertheless, and despite the advances made in the State of the Art, due to the previous inventions, in order to achieve the objective of creating concrete tower structures with precast parts erected at the final site, which will contribute to the known technology currently used in the State of the Art, it is necessary to devise a structure and procedure which enables it to be carried out in a viable manner with respect to mechanical resistance, therefore resulting in viable costs and execution time constraints, which is the object of the present invention.

SUMMARY OF THE INVENTION

The structure and assembly procedure for the wind turbine concrete towers which is the object of this invention and which is described below, consists of a procedure for erecting the concrete towers consisting of various stages or phases which may be developed at the same time in the different towers of a wind farm, including erection and pre-assembly activities of the sections of each tower of a wind generator in which each section of the tower structure may be composed of a different number of segments or longitudinal sections depending on the situation of that section in the height of the tower. This process comprises two differentiated sequences, one of pre-assembly for each tower section and the erection of said sections, including a pre-assembly phase for each section, a process divided into the following stages, for each section comprising different segments: a phase for the transport and erection of each segment, therefore there being as many phases as there are segments, followed by a final phase comprising filling in of the vertical joints of each section.

In addition, the aforementioned pre-assembly cycle may be carried out for the first section of the wind turbine tower directly on the final site on the base footing or foundation of the turbine whereas the other intermediate section are pre-mounted on assembly bases which are placed on the ground on the platform area provided in the proximity of the base of each wind turbine or on the base itself, placing the segments in their position with the aid of stabilising and bracing struts.

In addition, the erection cycle is begun following the first pre-assembly cycle, in the same wind turbine and this consists of placing each section on the previous one by hoisting with the aid of a crane and fitting it into the connection system of each section.

The Pre-assembly cycle of the first section also includes the following stages as a minimum, in the case of a tower consisting of four segments:

Verification of the geometry, levelling and implementation of the foundations and prior placing of the levelling plates with the pre-adjusted thickness in order to ensure that the support of the part is horizontal.

Coupling of the first segment, using a strut, by the hoisting bolts of the crown to the erection crane and by the lower bolts to the other retention crane or to a second pulley tackle of the erection crane.

Tipping of the segment in the air ensuring that the lower projecting bars (attachment to the base footing) do not collide and that they are not damaged or bent. Once in the vertical position the segment is placed vertically in its final location.

Lowering of the segment introducing the connection bars into the jacketing. Adjustment of the end of the strut in the perforated foundation plate.

Checking of the segment position. Adjustment by regulating the strut or with the crane, and release of the crane.

Repetition of the operation of the diametrically opposed segment.

Erection of the third segment, without the strut, connecting to the two segments already in place using mechanical clamps located at different heights in the vertical joints. Verification of the opening of the vertical joints along its height, checking of the segment position and release of the crane.

Erection of the closing segment, without a strut, attaching it to the previous ones with the same procedure as in point 3.

Introduction of the grills of the vertical joints from the upper end and any other elements requiring use of the crane.

Having erected all the segments checking of the overall position, including the position of the jacketing and making any necessary adjustments.

Removal of the adjustable struts using the crane.

Formwork of the lower horizontal joint and pouring of mortar to support and fix the first section to the base footing.

After or simultaneous to the pouring of the mortar for the lower horizontal joint, filling in with mortar of the vertical joints.

When sufficient resistance has been achieved in the mortar of the joints, the clamps are removed from the vertical joints.

In addition, the Pre-assembly cycle of the intermediate sections, comprising various segments, includes at least the following stages in the case where there are three segments.

Placing of the first segment on the pre-assembly bases in a similar manner to that described for the first section.

When placing the second segment as well as acting on the strut, the clamps of the vertical joint between the two segments are also tightened.

The erection of the closing segment is similar to that of the closing segment tin the first section and similarly it does not require a strut.

The final section comes pre-assembled from the factory, on a lorry placed in a horizontal position.

The erection cycle carried out with a high-powered crane consists of placing each section successively on the previous one, fitting and adjusting the connection system of the horizontal joints. In order to tip the final section, the lower end is coupled by encircling the section perimeter using a nylon belt or similar, fixed at a point on the lower edge of the section using a metal hook to avoid slipping.

Finally, in the event that the connection system of the horizontal joints is made by fitting passive bars in the appropriate jacketing, using connective mortar, the horizontal joints shall include at least the following stages:

Production of the non-retractile mortar.

Filling of all the jacketing, checking the volume of mortar introduced.

Following controlled filling of the jacketing, pouring of the mortar, filling the space in the horizontal joint between the two sections until an adequate thickness is obtained which will guarantee total contact on the surface of the joint between 2 sections.

DETAILED DESCRIPTION OF THE INVENTION

Figure 1:
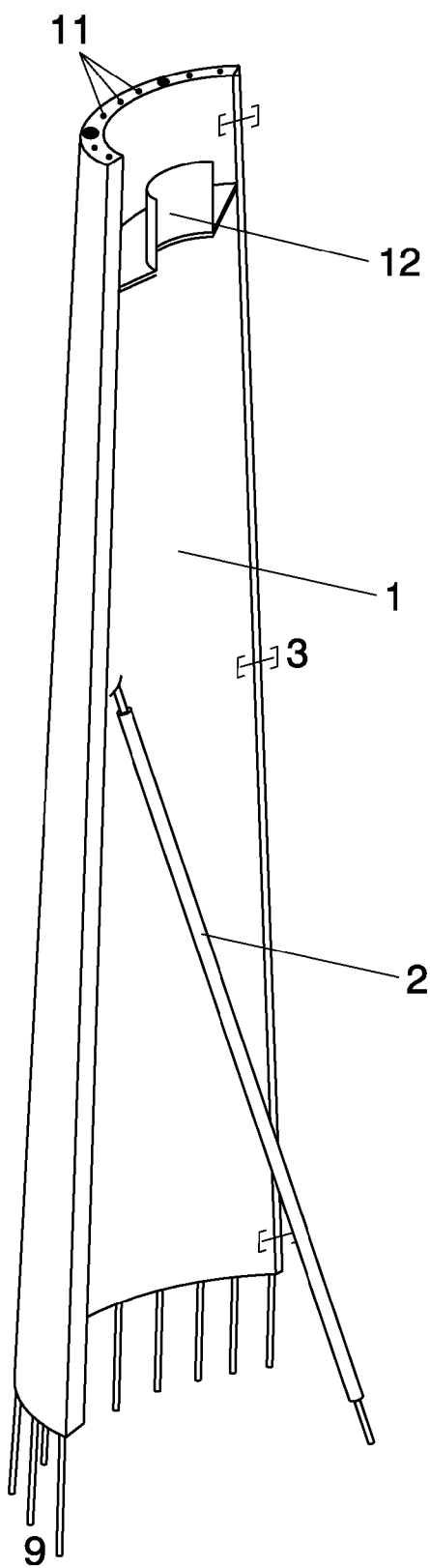
FIG. 1 is an illustration of a segment (1) with strut (2), clamps (3) and protruding bars (9) and work platform (12), in a structure and procedure for erecting concrete towers used in wind turbines.
Figure 2:
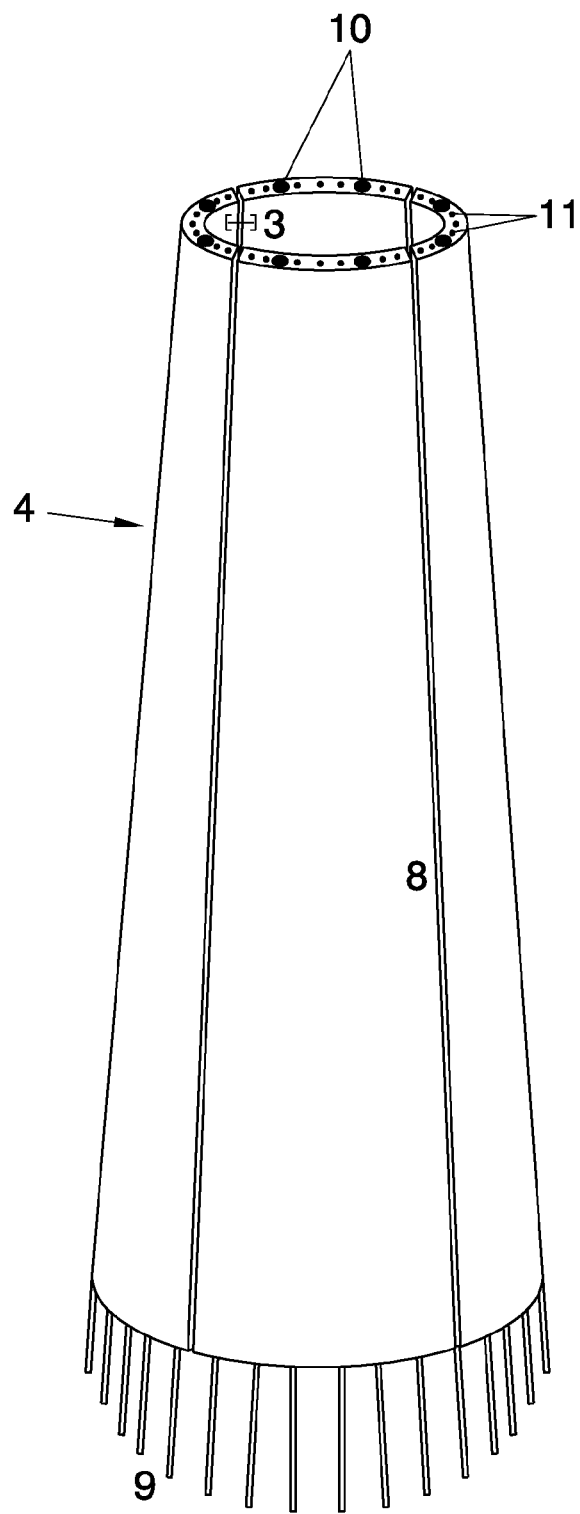
FIG. 2 is an illustration of a section (4) with vertical joints (8) between segments, the hoisting bolts (10) and the end of the jacketing (11), in a structure and procedure for erecting concrete towers used in wind turbines.
Figure 3:
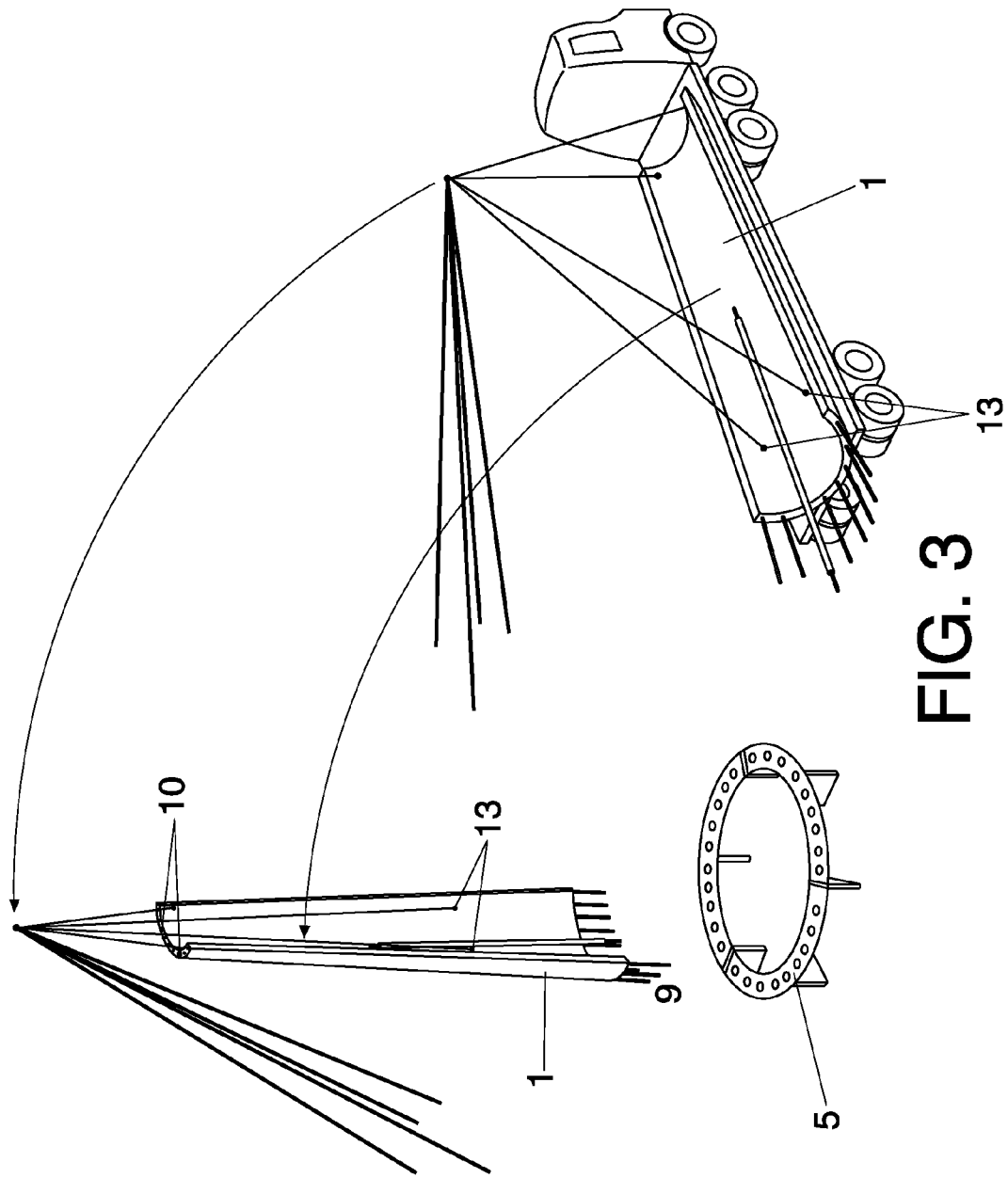
FIG. 3 is an illustration of the placing of a segment on the support bases (5) for the pre-assembly of a section, coupling to the crown hoist bolts (10) and the lower bolts (13), in a structure and procedure for erecting concrete towers used in wind turbines.
Figure 4:
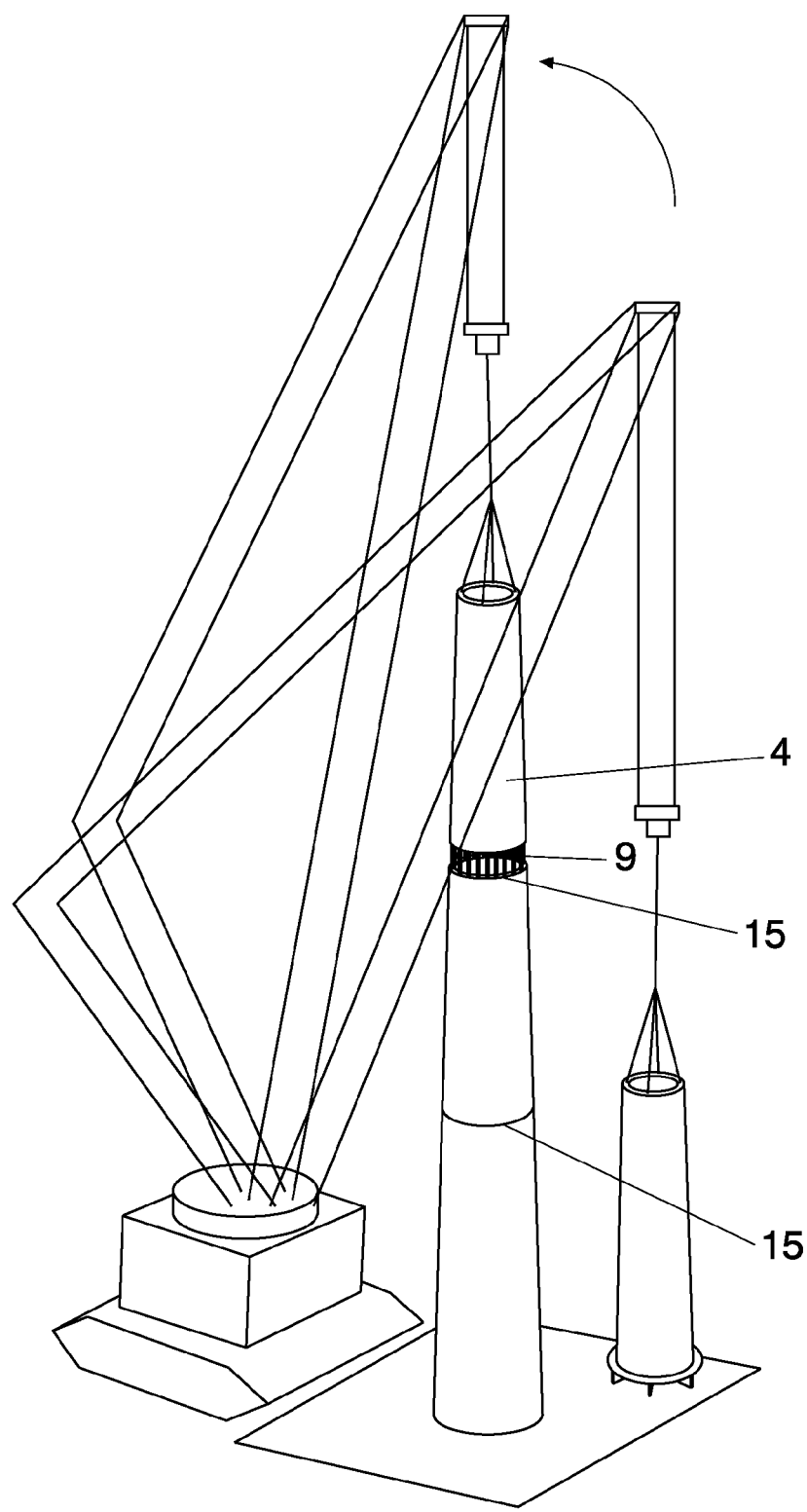
FIG. 4 is an illustration of the erection of sections (4), with horizontal joints (15) in a structure and procedure for erecting concrete towers used in wind turbines.
Figure 5:
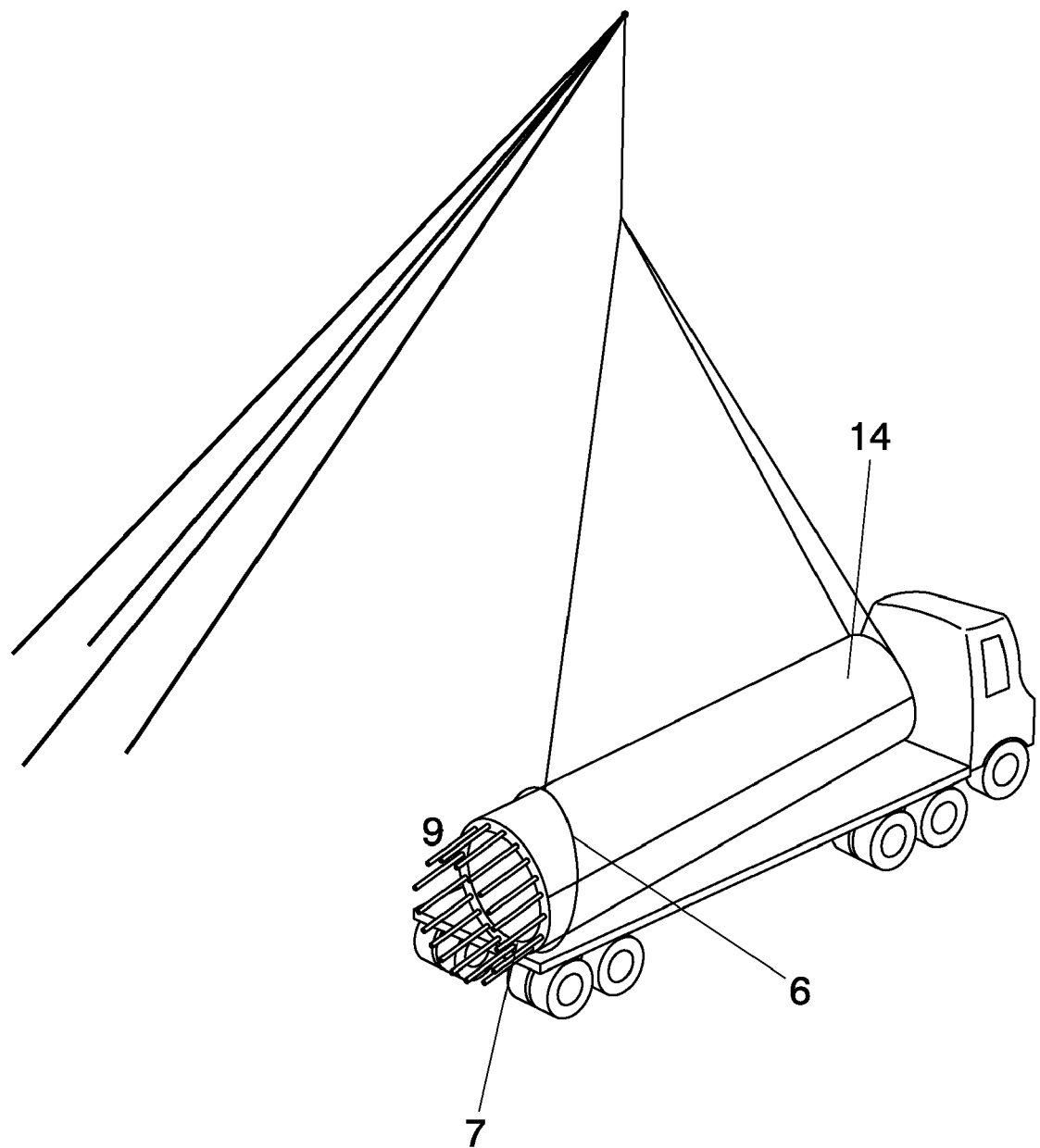
FIG. 5 is an illustration of the hoisting from a lorry, or flatbed truck of the crown section with the belt (6) and the hook (7) for the coupling of the lower section and coupling elements (14) in the crown in a structure and procedure for erection of concrete towers used in wind turbines.
Figure 6:
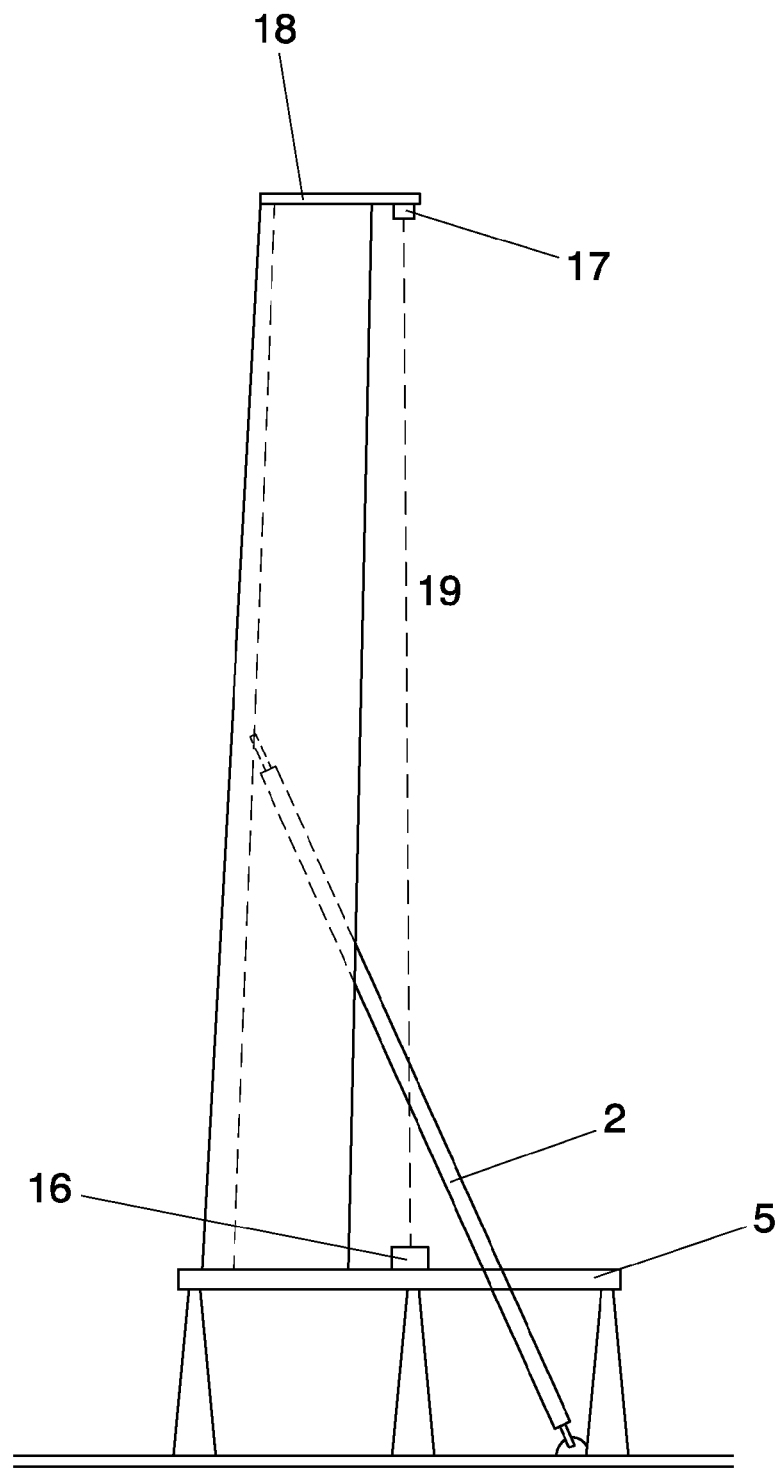
FIG. 6 is an illustration of the positioning of a segment on the support base (5) with the transmitter (16) of the vertical laser beam (19) and the target (17) fixed on a light structure (18) in a structure and procedure for erecting concrete towers used in wind turbines.
Figure 7:
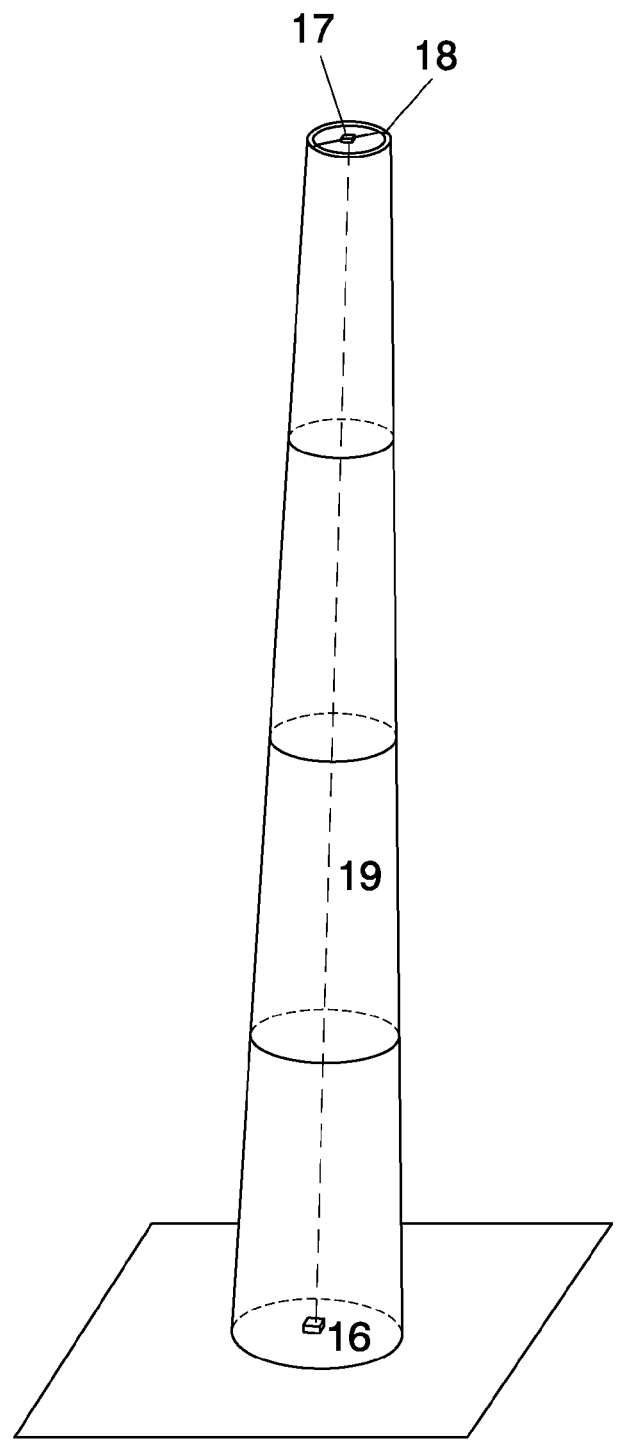
FIG. 7 is an illustration of the positioning of a section of the transmitter (16) of the vertical laser beam (19) and the target (17) fixed to a light structure (18) in a structure and procedure for erecting concrete towers used in wind turbines.

Below a detailed description is given of the procedure for erecting the concrete towers used in wind turbines, which are the object of this invention, with reference to the accompanying drawings, which represent, merely as an example which is in no way restrictive, of the preferential form of realisation susceptible to all those detailed variations which do not presuppose any fundamental alteration to the essential characteristics of the improvements.

According to the example of execution represented, the procedure for erecting concrete towers used in wind turbines illustrated in this preferential form of realisation consists basically of various stages or phases which may be developed at the same time on a parallel basis with the various towers in a wind farm, thus making optimum logistical use of the resources, materials and times necessary for assembly.

The aforementioned procedure includes two different cycles of activity, which may be developed alongside each other: the pre-assembly cycle and the erection cycle. In the example of realisation illustrated, both cycles have the same productive capacity: two towers per week. The pre-assembly cycle begins its activities some weeks beforehand, so that there is always a minimum advantage of having various towers in the erection cycle, thus avoiding interference of one over another.

Each section (4) of the tower structure may be composed of different number of segments (1) based on their position in the height of the tower. Thus, in this example, an 80 metre high tower, the first section (0-20) corresponding to the first twenty metres of height of the tower is made up of four segments, each limited by vertical sections (8) of that section of tower. The second section (20-40) between twenty and forty metres of the tower height, is composed of three segments, as well as the third section (40-60) that is, at a height of forty to sixty metres of the tower height which is also composed of three segments. The fourth section (60-80) however, comprises two segments, which come already pre-assembled in the factory in one single part.

The aforementioned pre-assembly for each section consists of a procedure divided into the following phases, for each section comprising different segments: one phase for transport and erection of each segment, therefore there are as many phases as there are number of segments, followed by a final filling stage of the vertical joints (8) of each section.

Thus, in the present example of realisation the pre-assembly of the first section (0-20) will be carried out in six stages, one comprising the arrival and assembly of each of the four segments, a fifth phase for filling the horizontal joint with the base footing and a sixth phase of filling the vertical joints, whereas the two following sections (20-40) and (40-60) shall be erected in four phases each, three for the arrival and erection of each segment and a fourth for filling the vertical joints.

The pre-assembly of the first section can be directly carried out on the base footing or foundation of the wind turbine, while the other intermediate sections shall be erected on mounting bases (5), which may be placed on the ground in the zone of the platforms provided in the proximity of the base of each wind turbine, or on the base itself in a position next to the tower.

Therefore, the aforementioned cycle of erection, is initiated following the first pre-assembly cycle in the same wind turbine, and consists of the placing of each section on the previous one; in this case, the placing of three sections each 20 metres high. In this operation each section is hoisted with the aid of a crane.

Therefore, the pre-assembly cycle is begun with erection of the segments of the first section of the present structure of each concrete tower for wind turbines, which in this preferential form of realisation comprise the 20 first metres of the tower. The structure of the aforementioned first section comprises four segments (1) in the form of a section of the trunk of a straight or curved generator cone provided with hoisting bolts (10) enabling them to be mounted directly onto the definitive foundation. Thus the pre-assembly of the first section of each tower comprises the following stages:

1. Verification of the geometry, levelling and implements of the foundations and the prior placing of the levelling plates with the pre-adjusted thickness for obtaining levelling of the part. The initial thickness of the plates is 20 mm.
2. The segments are transported and arrive at the site and are not stored at the wind farm but are placed directly from the lorry onto the foundation (or on the pre-assembly bases in the case of the segments in sections 2 and 3).
3. In the lorry the first segment is coupled by the hoisting crown bolts to the erection crane and by the lower bolts (13) to another retention crane or to a second pulley tackle of the erection crane.
4. The segment is turned in the air ensuring that the protruding lower bars (9) (of the attachment to the base footing) do not collide or are damaged or bent. Having achieved the vertical position, the lower retaining bolts (13) are released and the segment hangs solely from just the crown bolts (10). The segment is then placed upright in its final location.
5. The segment is lowered placing the connection bars in their jacketing. As the segment is lowered the strut 2 is activated in order to adjust the end of the perforated plate of the foundation.
6. The position of the segment is checked. This is adjusted using the strut or the crane, increasing or reducing thickness of the levelling plates if necessary.
7. The operation is repeated with the diametrically opposed segment.
8. Erect the third segment, connecting it to the two segments already fitted by means of mechanical clamps (3) located in the vertical joints. With the segment at the appropriate height, tighten the clamps and check the opening of both vertical joints (8) along their height. The segment position is checked and the crane is released.
9. The fourth closing segment is erected by attaching it to the two first segments using the same procedure as with the third segment.
10. Having erected the 4 segments, the overall position is checked once more and any necessary adjustments made
11. The grills of the vertical joints are introduced from the upper end
12. The 2 struts (2) are removed using the crane at the upper part of the section and any other elements required are introduced using the crane.
13. Formwork is laid around the horizontal joint of the base footing using a 5 cm high frame outside and inside the segments, separating their faces at a distance of 5 cm, the non-retractile mortar is then poured.
14. Previously, after or simultaneous to the pouring of the mortar for the lower horizontal joint, the mortar is poured in the vertical joints.
15. Having achieved sufficient resistance in the mortar of the vertical joints, the clamps (3) of the vertical joints are removed.

The procedure continues with the pre-assembly of sections 2 (20-40 m) and 3 (40-60 m).

The procedure is similar to that of erection of the first section except that it is carried out on provisional foundation using (5) pre-assembly bases and with the following differences:

The first segment erected is provided with a cross bracing support (2) in order to guarantee its provisional stability.

For the second segment it is necessary to tighten the clamps (3) of the vertical joint.

The erection of the third closing segment is similar to the closing segments of the first section.

The lower horizontal joint will not be concreted.

Below the procedure for erecting the concrete towers used in wind turbines continues with the erection of the sections (4) pursuant to the following stages:

1. Placement of levelling plates on the crown of the first section.
2. Placement around the edge of a profile of self-adhesive foam, tangential to the external edge of the surface of the crown of section 1°, and a profile with an L shaped section which serves as internal formwork.
3. Coupling of the crane to the crown bolts (10) of the second section, using slings.
4. Access to the platform (12) of the previous section (the first). Lifting of the second already pre-assembled section, and placement in its final location.

5. Lowering of the section, introducing the protruding reinforcement (9) into the jacketing (11) of the first section until it rests on the levelling plates.
6. Checking of the level of the second section. Correction of the position, if necessary acting on the thickness of the steel plates, while suspending the section with the crane.
7. Access to the upper platform (12) of the second section in order to uncouple the crane.

This procedure is repeated for the third section.

Erection of the fourth section, according to the following stages:

1. The fourth section is pre-assembled in the factory, on a lorry. Using slings the erection crane is coupled by 2 metal coupling elements (14), which are screwed to the section crown. Another retaining crane or other pulley tackle from the same crane will hook onto a belt (6) surrounding the section at approximately one metre from the lower end and which passes through a hook (7) which holds the lower rib of the section and stops the belt from slipping in the turning operation.
2. The fourth section is raised approximately one metre and the transport vehicle is removed.
3. The section is then turned by lifting the upper end with the erection crane while the crane, or second pulley tackle retaining it holds the lower end at sufficient height to ensure that the protruding bars (9) do not hit the ground.
4. Having achieved a vertical position, the crane or second retaining pulley tackle releases the load, transferring the full load to the erection crane. The belt and the coupling from the lower end are removed.
5. The fourth section is located on top of the third section and a similar procedure is followed for placing the second and third sections in their final position. In order to realise the horizontal joints (15) where the system for joining the horizontal joints is by fitting passive bars (9) in jacketing (11) with connective mortar, the following stages will be followed:
    1. The non-retractile mortar is produced using a special mixer with a dosage specified according to the manufacturer instructions.
    2. Firstly, all the jacketing of each joint are filled, checking the volume of the mortar introduced. There are openings in the head of all the jacketing in order to facilitate this operation.
    3. Following controlled filling of the jacketing, the mortar is poured, filling the space of the horizontal joint (15) between sections.

Finally, the form materials and dimensions and number of parts may vary, and in general anything which is an accessory or secondary may be employed provided that it does not alter, change or essentially modify the improvements described herein.

What is claimed is:

1. A method for erecting a concrete tower for a wind turbine wherein said tower comprises a concrete base section and at least one concrete upper section, at least some of said sections further comprising longitudinal segments, said method comprising:
    erecting a first plurality of longitudinal segments to form the base section;
    after erecting the first plurality of longitudinal segments, filling a first plurality of vertical joints between the first plurality of longitudinal segments with mortar;
    connecting the base section to a base footing of the tower;
    erecting, on a mounting base, a second plurality of longitudinal segments to form an upper section;
    after erecting the second plurality of longitudinal segments, filling a second plurality of vertical joints between the second plurality of longitudinal segments with mortar;
    placing the erected upper section on top of the base section; and
    after placing the erected upper section, connecting said base section to said upper section.

2. The method of claim 1, wherein:
    erecting at least one of the first plurality of longitudinal segments and the second plurality of longitudinal segments further comprises providing a temporary support for at least one of the segments.

3. The method of claim 1, further comprising:
    placing a second upper section on top of the upper section; and
    connecting the second upper section to the upper section.

4. The method of claim 1, wherein:
    connecting the base section to the upper section includes filling a horizontal joint between the base section and the upper section with mortar.

5. The method of claim 1, wherein:
    connecting the base section to the upper section includes inserting protruding bars extending from the base section into corresponding openings disposed in the upper section.

6. The method of claim 1, wherein:
    connecting the base section to the upper section includes inserting protruding bars extending from the upper section into corresponding openings disposed in the base section.

7. The method of claim 1, wherein erecting the first plurality of longitudinal segments to form the base section includes:
    erecting a first segment and adjusting its position with a strut;
    erecting a diametrically opposed second segment and adjusting its position with a strut;
    erecting a third segment connecting the first and second segments without using a strut; and
    erecting a fourth closing segment without using a strut.

8. The method of claim 1 wherein erecting the second plurality of longitudinal segments to form the upper section includes:
    erecting a first segment and adjusting its position with a strut;
    erecting a second segment and adjusting its position with a strut; and
    erecting a third closing segment without using a strut.

9. The method of claim 1, wherein:
    erecting the first plurality of longitudinal segments further comprises verifying a correct position of each segment in the first plurality of segments with a laser beam.

10. The method of claim 1, wherein:
    the step of erecting the second plurality of longitudinal segments further comprises verifying a correct position of each segment in the second plurality of segments with a laser beam.

11. The method of claim 1, further comprising:
    pre-assembling a top section prior to its delivery to a wind farm.

12. The method of claim 11, wherein:
    the top section comprises two segments.

13. The method of claim 1, further comprising:
    temporarily securing each segment in the first plurality of segments to an adjacent segment with a clamp; and removing the clamps once the mortar filling the first plurality of vertical joints becomes resistant enough to hold the segments in place.

14. The method of claim 1, further comprising:

temporarily securing each segment in the second plurality of segments to an adjacent segment with a clamp; and removing the clamps once the mortar filling the second plurality of vertical joints becomes resistant enough to hold the segments in place.

15. The method of claim 13, wherein the clamps are located at different heights.

16. The method of claim 14, wherein the clamps are located at different heights.

17. The method of claim 1, wherein:

placing the upper section on top of the base section is performed with a crane.

18. The method of claim 1, wherein:

placing the upper section on top of the base section further comprises placing leveling plates on a crown of the base section.

19. The method of claim 1, wherein:

placing the upper section on top of the base section further comprises verifying a correct position of the upper section with a laser.

20. The method of claim 1, wherein a plurality of towers are erected essentially simultaneously.

* * * * *